Sept. 11, 1928.
H. A. KEINER
PROTECTIVE DEVICE
Filed Sept. 21, 1927
1,683,977
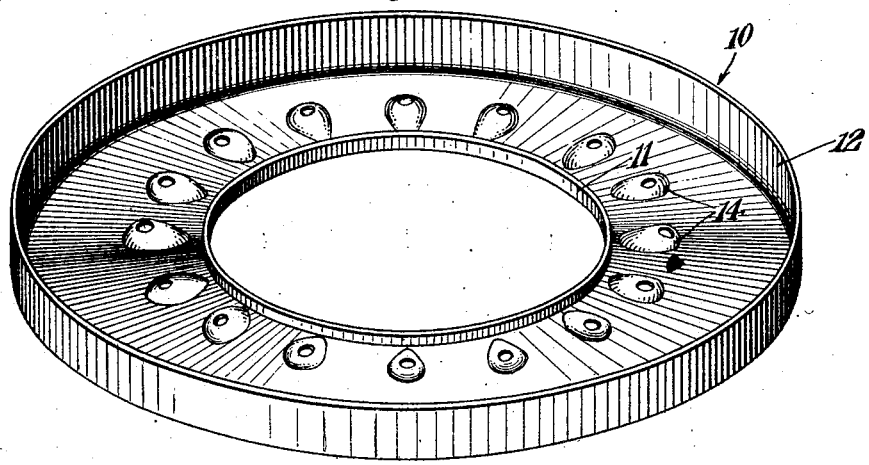
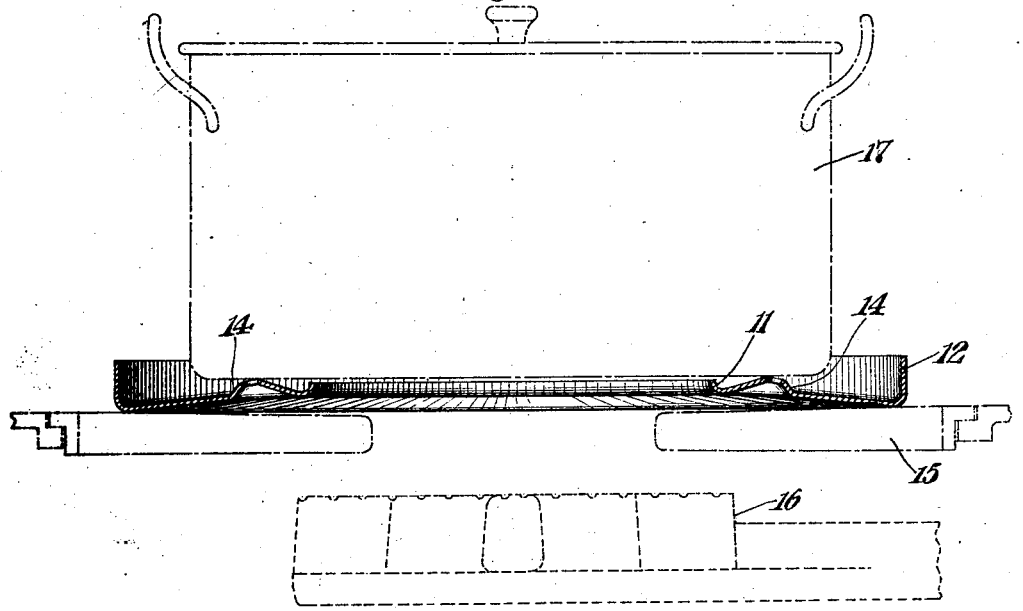

Patented Sept. 11, 1928.

1,683,977

UNITED STATES PATENT OFFICE.

HENRY A. KEINER, OF KEW GARDENS, NEW YORK.

PROTECTIVE DEVICE.

Application filed September 21, 1927. Serial No. 220,936.

This invention relates to protective devices for use in connection with gas and oil stoves or the like. With such stoves the boiling over of the contents of a cooking utensil may be productive of very serious consequences.

An object of this invention is an improved means for use in connection with gas or oil stoves to prevent liquid boiling over from a cooking utensil reaching the burner of the stove.

Other objects, novel features and advantages of this invention will be apparent from the following specification and accompanying drawing wherein—

Fig. 1 is a perspective view of a device embodying the invention and Fig. 2 is a section through a device in operative position, a cooking utensil and the parts of the stove being shown in dotted lines.

The protector 10 comprises an annular metallic member having its inner and outer edges bent parallel to its axis as indicated at 11 and 12 respectively. The annular member slopes upwardly toward its axis. A plurality of projections 14 are upset from the annular member adjacent its inner edge and terminate in apertures. The inner edge of each of these apertures is higher than the inner edge of the annular member and is also higher than the outer edge of the aperture.

When in use the protector is laid upon the grid 15 of the stove with which the device is to be used which grid over lies the burner 16. The protector is in contact with the grid 15 only adjacent its outer edge, the inner edge being upwardly spaced from the grid. The cooking utensil 17 is supported from the member 10 and contacts only with the inner edges of the apertures due to the fact that these edges extend beyond the inner edge 11 of the member 10 as well as the outer edges of the apertures. As the bottom of the cooking utensil is spaced slightly above the inner edge 11 there is formed a chamber into which the flame and hot gases from the burner may pass thus assisting in the heating of the contents of the utensil 17. Moreover the projections 14 form flues through which the flame and hot gases may be directed to the outer portions of the utensil 17.

With this protector it is impossible for liquid boiling over from the utensil 17 to reach the burner 16. In the event of liquid boiling over from the utensil 17 it is caught by the protector and is either evaporated immediately or collects in the outer portion of the member 10 due to the direction of slope thereof. Should there be an accumulation of liquid in the protector it will drain off through the apertures without coming into contact with the burner 16.

The above described device effectively protects the burner from liquid boiling over from a cooking utensil and also permits the flame and hot gases to come into intimate contact with the surface of the utensil. It also assists in distributing the heat around the cooking utensil and widens the contact of the flame with the utensil.

The protector may be of any desired size and may be made of any suitable metal. Preferably the apertures are arranged beyond the periphery of the burner so that liquid dropping through them does not strike the burner. As the utensil contacts only with the inner edges of the apertures, substantially the whole bottom of the utensil is in contact with the flame or the hot gases.

What I claim is:

1. A device of the character described comprising a convex annular member having its inner and outer edges bent parallel to its axis, a plurality of projections upset from said member and terminating in apertures having their inner edges of greater height than their outer edges.

2. A device of the character described comprising a convex annular member having its inner and outer edges bent parallel to its axis, a plurality of projections upset adjacent its inner edge and terminating in apertures, the inner edge of each aperture being higher than the inner edge of said annular member and its own outer edge.

In testimony whereof, I have signed my name to this specification.

HENRY A. KEINER.